US008555063B2

(12) United States Patent
Xiao et al.

(10) Patent No.: US 8,555,063 B2
(45) Date of Patent: Oct. 8, 2013

(54) METHOD FOR ESTABLISHING A WIRELESS LINK KEY BETWEEN A REMOTE DEVICE AND A GROUP DEVICE

(75) Inventors: Lu Xiao, San Diego, CA (US); Yong Jin Kim, San Diego, CA (US); Zhanfeng Jia, Belmont, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 12/571,014

(22) Filed: Sep. 30, 2009

(65) Prior Publication Data

US 2011/0078445 A1    Mar. 31, 2011

(51) Int. Cl.
*H04L 9/32* (2006.01)

(52) U.S. Cl.
USPC ........................................................ 713/168

(58) Field of Classification Search
USPC .......................................... 713/163, 168, 171
See application file for complete search history.

(56) References Cited

U.S. PATENT DOCUMENTS

| 5,517,567 A * | 5/1996 | Epstein .......................... 380/247 |
| 2005/0266798 A1 * | 12/2005 | Moloney et al. ............. 455/41.2 |
| 2008/0267407 A1 | 10/2008 | Vanderveen | |
| 2009/0240944 A1 * | 9/2009 | Cho et al. ....................... 713/175 |

FOREIGN PATENT DOCUMENTS

| EP | 1233570 A1 | 8/2002 |
| WO | WO03056746 A1 | 7/2003 |
| WO | WO2005053267 A1 | 6/2005 |

OTHER PUBLICATIONS

IEEE Trial-Use Recommended Practice for Multi-Vendor Access Point Interoperability via an Inter-Access Point Protocol Across Distribution Systems Supporting IEEE 802.11 Operation, IEEE Std 802.11f, Jul. 2003.
Dutta A., et al., "Systems Modeling for IP-Based Handoff Using Timed Petri Nets", System Sciences, 2009, HICSS 09, 42nd Hawaii International Conference on, IEEE, Piscataway, NJ, USA, (Jan. 5, 2009), pp. 1-10, XP031408779, ISBN: 978-0-7695-3450-3.
International Search Report and Written Opinion—PCT/US2010/050985, International Search Authority—European Patent Office—Mar. 18, 2011.
Misic, et al., "ZigBee: A long way to go", 1-81, vol. 4, No. 3, (Apr. 1, 2007), pp. 32-35, XP022127025.
The Bluetooth Forum: "Bluetooth security", Internet Citation, (Feb. 22, 2001), XP002171382, Retrieved from the Internet: URL:http://www.bluetooth.com/developer/specification/specification.asp [retrieved on Jul. 6, 2001] p. 148, line 1—p. 158, line 12.

\* cited by examiner

*Primary Examiner* — Kambiz Zand
*Assistant Examiner* — Dant Shaifer Harriman
(74) *Attorney, Agent, or Firm* — Won Tae Kim

(57) ABSTRACT

Disclosed is a method for establishing a wireless link key between a remote device and a group device. In the method, the remote device obtains a group identifier from the group device, and determines whether the group device is associated with a group having a trust association with the remote device. When the group device is determined to be associated with a group having an established trust association with the remote device, the remote device forwards a link setup request to the group device for virtually pairing with the group device using the trust association to establish the wireless link key. When the group device is determined not to be associated with a group having an established trust association with the remote device, the remote device forwards a pairing request to the group device for pairing with the group device to establish the wireless link key.

81 Claims, 5 Drawing Sheets

METHOD FOR ESTABLISHING A WIRELESS LINK KEY BETWEEN A REMOTE DEVICE AND A GROUP DEVICE

BACKGROUND

1. Field

The present invention relates generally to the establishment and use of a security association between a remote wireless device and a group of interconnected group devices.

2. Background

Low-power networks that wirelessly transfer data over short distances are becoming prevalent due to advantages over traditional wired connections that use cables. Bluetooth and ZigBee are examples of standards for short range wireless networks.

Wireless communications between wireless peer devices may use a pairing process to establish a long-term master key. For security purposes, the pairing process generally requires a user's involvement for authorization and verification. Thus, a remote wireless device may need to separately pair with each device within an interconnected group of devices, which may burden or otherwise inconvenience the user.

Alternatives to multiple pairings are the use of a public key infrastructure or a central authentication server. However, these alternatives generally increase the capability level and provisioning cost of remote device. Also, it is often difficult to revoke a compromised certificate of a dormant or out-of-range device.

There is therefore a need for a technique for simple and efficient security for low-power wireless communications between a remote device and a group device.

SUMMARY

An aspect of the invention may reside in a method for establishing a wireless link key between a remote device and a group device. In the method, the remote device obtains a group identifier from the group device over a wireless channel, and determines, using the group identifier, whether the group device is associated with a group having a trust association with the remote device. When the group device is determined to be associated with a group having an established trust association with the remote device, the remote device forwards a link setup request to the group device for virtually pairing the remote device and the group device using the trust association to establish the wireless link key. When the group device is determined not to be associated with a group having an established trust association with the remote device, the remote device forwards a pairing request to the group device for pairing the remote device and the group device to establish the wireless link key.

In a more detailed feature of the invention, forwarding a pairing request may include establishing a trust association with the group. The trust association may be a master key stored by the remote device and by at least one group super device. The master key is specific to the remote device after having been generated in response to a previous pairing request from the remote device to another group device. The master key may be stored by at least one group super device in association with an identification value for the remote device. The remote device's identification value may include an address for the remote device. The group identifier may be included in an address for the group device. The group device may be a reader device, and the remote device may be a sensor device.

In other more detailed features of the invention, forwarding a link setup request may include forwarding a first random value to the group device. The remote device may receive a second random value from the group device, and generate the wireless link key based on the first and second random values and the master key. The remote device may receive a first message integrity code from the group device, and verify the first message integrity code using the first and second random values and the wireless link key. Further, the remote device may generate a second message integrity code based on the first and second random values and the wireless link key, and forward the second message integrity code to the group device. The first random value may be a first nonce, and the second random value may be a second nonce.

Another aspect of the invention may reside in a remote device that includes means for obtaining a group identifier from a group device over a wireless channel; means for determining, using the group identifier, whether the group device is associated with a group having a trust association with the remote device; means for forwarding a link setup request to the group device, when the group device is determined to be associated with a group having an established trust association with the remote device, for virtually pairing the remote device and the group device using the trust association to establish the wireless link key; and means for forwarding a pairing request to the group device, when the group device is determined not to be associated with a group having an established trust association with the remote device, for pairing the remote device and the group device to establish the wireless link key.

Another aspect of the invention may reside in an apparatus for establishment of a wireless link key. The apparatus may include a processor configured to: obtain a group identifier from the group device over a wireless channel; determine, using the group identifier, whether the group device is associated with a group having a trust association with a remote device; forward a link setup request to the group device, when the group device is determined to be associated with a group having an established trust association with the remote device, for virtually pairing the remote device and the group device using the trust association to establish the wireless link key; and forward a pairing request to the group device, when the group device is determined not to be associated with a group having an established trust association with the remote device, for pairing the remote device and the group device to establish the wireless link key.

Another aspect of the invention may reside in a computer program product, comprising computer readable medium, comprising: code for causing a computer to obtain a group identifier from the group device over a wireless channel; code for causing a computer to determine, using the group identifier, whether the group device is associated with a group having a trust association with a remote device; code for causing a computer to forward a link setup request to the group device, when the group device is determined to be associated with a group having an established trust association with the remote device, for virtually pairing the remote device and the group device using the trust association to establish the wireless link key; and code for causing a computer to forward a pairing request to the group device, when the group device is determined not to be associated with a group having an established trust association with the remote device, for pairing the remote device and the group device to establish the wireless link key.

Also, an aspect of the invention may reside in another method for establishing a wireless link key between a group device and a remote device. In the method, a group identifier for the group device is transmitted over a wireless channel. The group device receives a request from the remote device, and determines whether the request is a link setup request or a pairing request. When the request is determined to be a link setup request, a link key between the group device and the remote device is established, using an established trust association between the remote device and a group associated with the group device, for virtually pairing the group device with the remote device. When the request is determined to be a pairing request, the remote device with the group device are paired to establish the wireless link key.

In a more detailed feature of the invention, when the request is determined to be a pairing request, a trust association with the group is established for the remote device. The trust association may be a master key stored by the remote device and by at least one group super device. The master key is specific to the remote device after having been generated in response to a previous pairing request from the remote device to another group device. The group identifier may be included in an address for the group device. The group device may be a reader device, and the remote device may be a sensor device.

In a more detailed feature of the invention, the group device may receive a first random value and an identification value associated only with the remote device with the link setup request. The group device may generate a second random value, and may forward the first and second random values, and remote device's identification value, to at least one group super device. The group device may receive a wireless link key generated by a group super device based on the first and second random values and the master key associated only with the remote device's identification value. The group device may forward the second random value and a first message integrity code, to the remote device. The first message integrity code is generated based on the first and second random values and the wireless link key. The group device may receive a second message integrity code from the remote device. The second message integrity code is generated by the remote device based on the first and second random values and the wireless link key. The group device may verify the second message integrity key using the first and second random values and the wireless link key to further establish the wireless link key. The first random value may be a first nonce, and the second random value may be a second nonce. The master key may be stored by at least one group super device in association with an identification value for the remote device. The remote device's identification value may be an address for the remote device.

Another aspect of the invention may reside in a group device that includes means for transmitting a group identifier for the group device over a wireless channel; means for receiving a request from a remote device; means for determining whether the request is a link setup request or a pairing request; means for establishing a link key between the group device and the remote device, using an established trust association between the remote device and a group associated with the group device, for virtually pairing the group device with the remote device when the request is determined to be a link setup request; and means for pairing the remote device with the group device to establish the wireless link key when the request is determined to be a pairing request.

Another aspect of the invention may reside in an apparatus for establishment of a wireless link key. The apparatus may include a processor configured to: transmit a group identifier for the apparatus over a wireless channel; receive a request from the remote device; determine whether the request is a link setup request or a pairing request; establish a link key between the apparatus and the remote device, using an established trust association between the remote device and a group associated with the apparatus when the request is determined to be a link setup request, for virtually pairing the apparatus with the remote device; and pairing the remote device with the apparatus to establish the wireless link key when the request is determined to be a pairing request.

Another aspect of the invention may reside in a computer program product, comprising computer readable medium, comprising: code for causing a computer to transmit a group identifier for a group device over a wireless channel; code for causing a computer to receive a request from a remote device; code for causing a computer to determine whether the request is a link setup request or a pairing request; code for causing a computer to establish a link key between the group device and the remote device, using an established trust association between the remote device and a group associated with the group device when the request is determined to be a link setup request, for virtually pairing the group device with the remote device; and code for causing a computer to pair the remote device with the group device to establish the wireless link key when the request is determined to be a pairing request.

DETAILED DESCRIPTION

Figure 1:
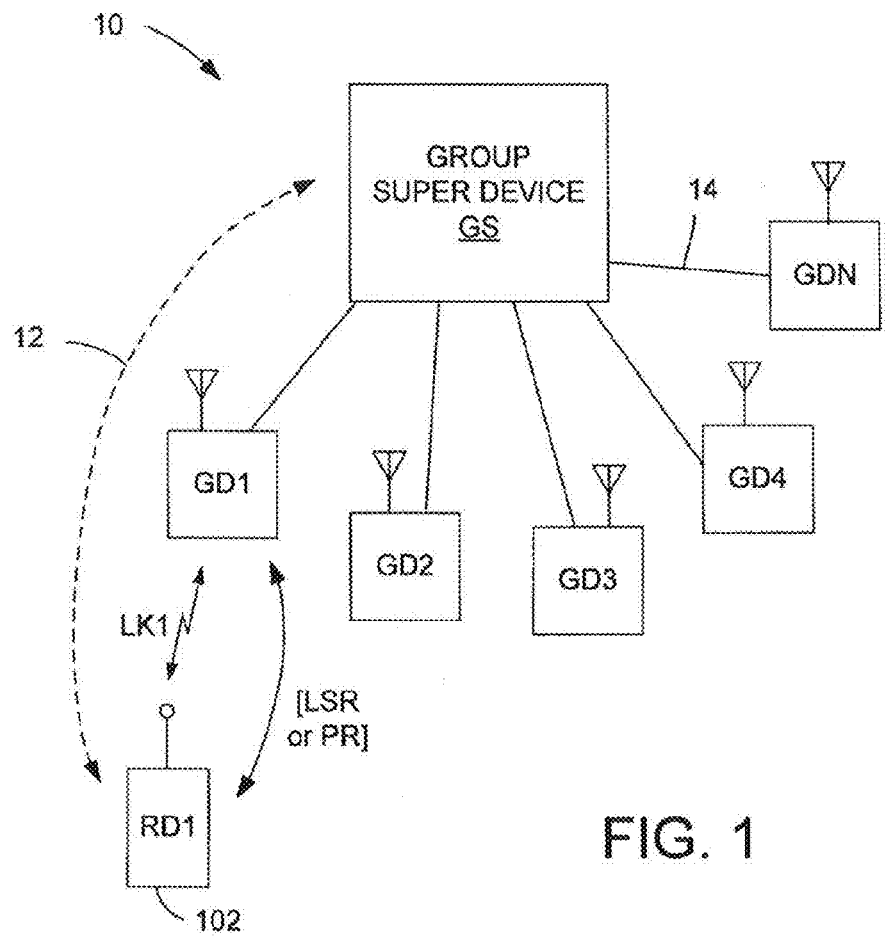
FIG. 1 is a block diagram of an example of a wireless communication system having a group of devices.
Figure 2:
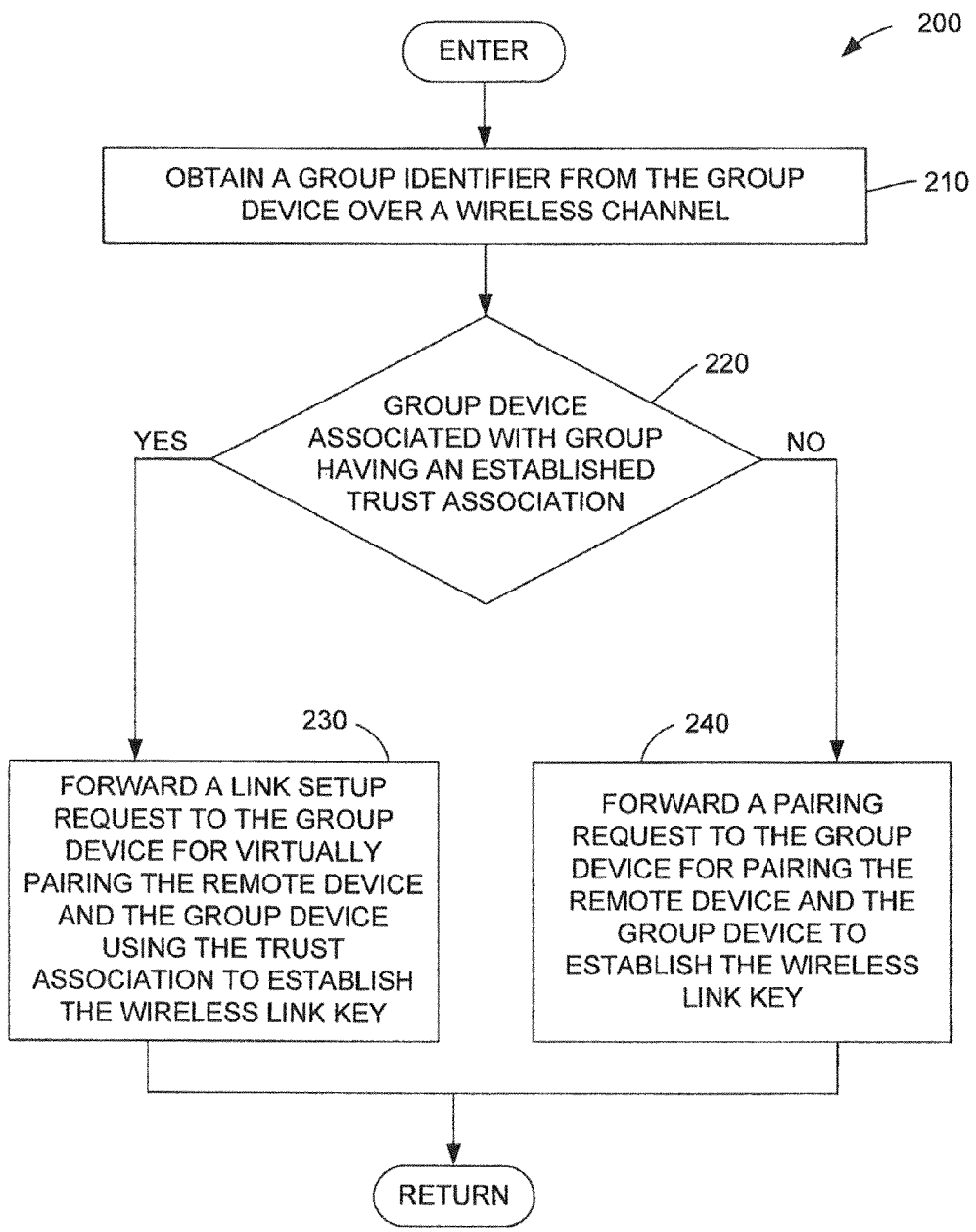
FIG. 2 is a flow diagram of a method for establishing a wireless link key between a remote device and a group device including a determination of whether an established association exists with the group.
Figure 3:
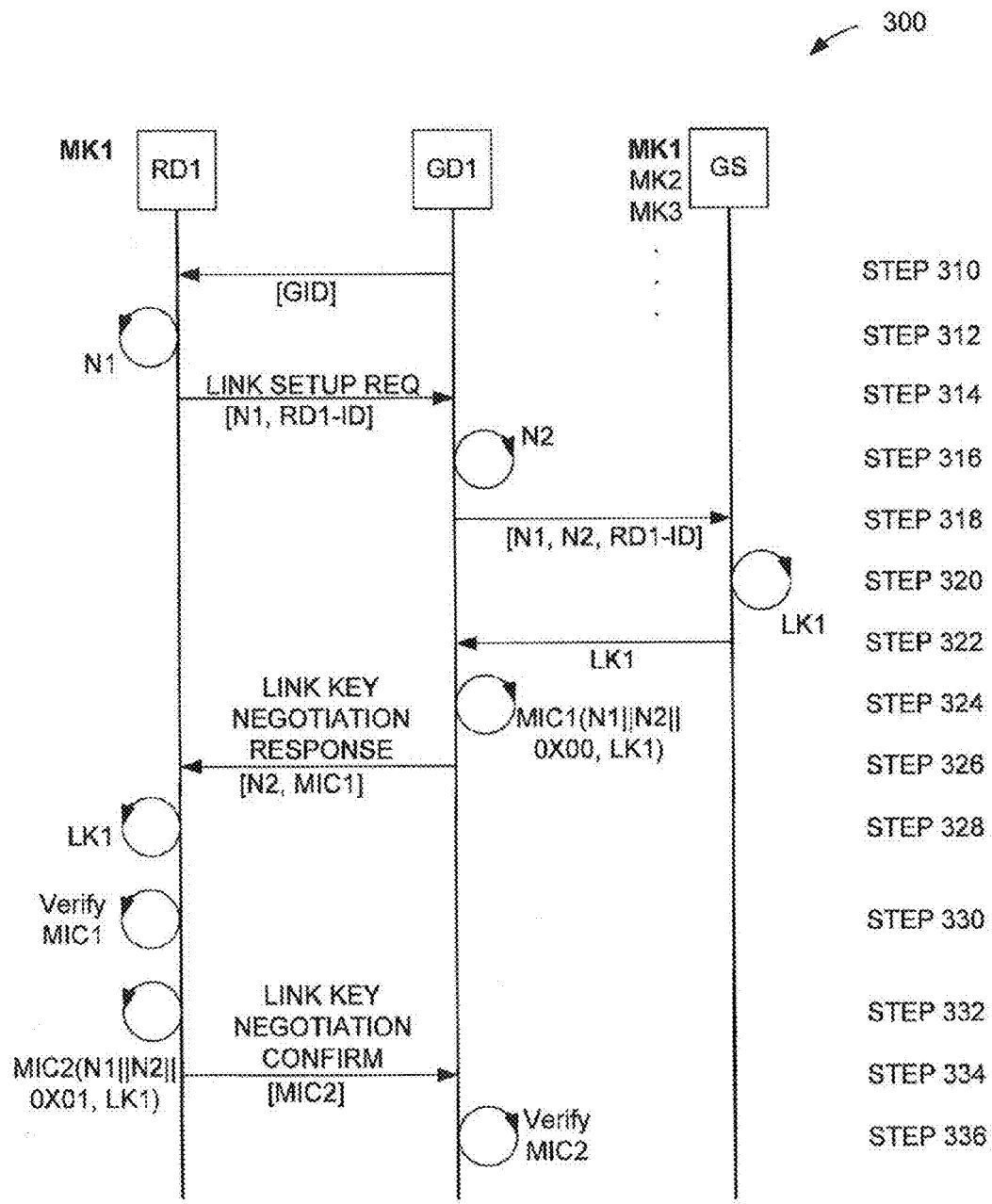
FIG. 3 is a flow diagram for establishing a wireless link key using an established trust association.

With reference to FIGS. 1-3, an aspect of the invention may reside in a method 200 for establishing a wireless link key LK1 between a remote device RD1 and a group device GD1. In the method, the remote device obtains a group identifier GID from the group device over a wireless channel (step 210), and determines, using the group identifier, whether the group device is associated with a group 10 having a trust association with the remote device (step 220). When the group device is determined to be associated with a group having an established trust association with the remote device, the remote device forwards a link setup request LSR to the group device for virtually pairing 12 the remote device and the group device using the trust association to establish the wireless link key (step 230). When the group device is determined not to be associated with a group having an established trust association with the remote device, the remote device forwards a pairing request PR to the group device for pairing the remote device and the group device to establish the wireless link key (step 240).

The step of forwarding a pairing request PR (step 240) may include establishing a trust association with the group 10. The trust association may be a master key MK1 stored by the remote device RD1 and by at least one group super device GS.

The master key is specific to the remote device after having been generated in response to a previous pairing request PR from the remote device to another group device GDN. The master key may be stored in association with an identification value RD1-ID for the remote device. The remote device's identification value RD1-ID may include an address for the remote device RD1. The group device may be a reader device, and the remote device may be a sensor device.

Figure 4:
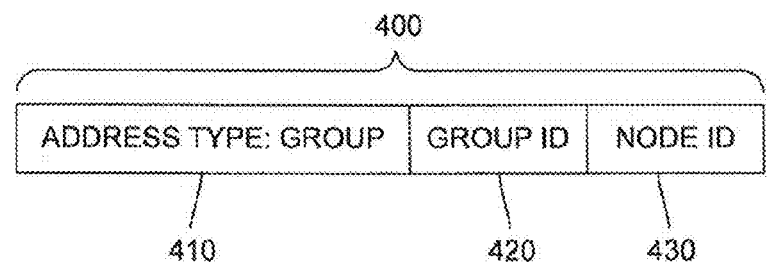
FIG. 4 is a schematic block diagram of a group address.

As shown in FIG. 4, the group identifier GID may be included in an address 400 for the group device GD1. The address can be divided into 3 parts: an address type 410, a group identification (ID) 420, and a node or device identification (ID) 430. There may be several address types for a device. An address type, called Group, may be defined for group devices. Other address types may be a permanent device address assigned to a device during manufacture, or a temporary address used to frustrate tracking attacks. The temporary address may be generated randomly or may contain a tag derived from a shared secret and a random prefix. The group ID 420 is an identifier for a particular group of devices. The group ID may be assigned globally or configured locally. Its space must be large enough to uniquely identify a group of devices from other groups. The device ID 430 is an identifier of a particular device in a group.

Each group 10 has at least one group super node or device GS. The group super device GS may be assigned a special pre-defined ID within a group 10, e.g., 0x0 for first group super device. The group devices GDN and the group super device GS have secure links 14 to communicate. These secure links may use the same connection technique as that used with a remote device RD1. It is also possible that the group devices may be connected using other techniques. For example, a remote device may use Bluetooth to communicate with any group device GDN, while all group devices are inter-connected with an Ethernet network or a Wireless LAN. Typically, the group super device is more capable than other devices in the group in terms of higher computation power and less battery constraint. The group super device is always available to the group devices GDN.

The remote device RD1 needs' to actually pair only once with a group device GDN of the group 10. In that first (and only required) pairing, the master key MK1 is provisioned and stored by the group super device GS and by the remote device. After the initial pairing, the master key may be used to derive a link key LK1 to establish a "virtual" pairing with any of the group devices. Advantages of this virtual pairing are speed and convenience. As an example, it may take several seconds to perform an actual pairing and establishment of a master key, but it may take only about a millisecond to establish a link key based on an existing master key in a virtual pairing. Further, user input is not needed in a virtual pairing with a subsequent group device of the group.

The group super device GS generally performs all pairing related computation, and manages the master key MK1 and the link keys LK1-LKN shared with a remote device RD1. The group super device may maintain a table of paired remote device for managing the master keys. Each group device GDN relies on the group super device GS to establish a link key LK1 for secure communication with a remote device RD1. Note that one compromised group device cannot eavesdrop or forge packets exchanged between another group device and a remote device.

In a pairing request, the group device GD1 forwards pairing commands between the group super device GS and the remote device RD1. The group device GD1 is responsible for all link level communication with the remote device, except pairing related management. For some pairing related commands, the group device acts like man-in-the-middle between the remote device and the group super device. The group device may use a simple upper-layer protocol to forward paring-related PDU (Protocol Data Unit) from the remote device to the group super device, and vice versa.

A trust association can be created by various ways. For example, it can be PIN-based verification in Bluetooth, or distance-based verification in NFC (Near Field Communication). The group device GD1 may take certain duty to authenticate the remote device RD1. For example, GD1 may verify that the RD1 is located within a short range defined by NFC. User involvement is usually required in this process. This invention leverages such one-time user involvement to enable virtual pairing of a remote device RD1 with all group devices GDN in group 10.

During pairing, the super group device GS and the remote device RD1 establish a shared master key MK1, which is a secret to the intervening group device GD1. A typical method for master key establishment is a Diffie-Hellman key exchange. The user involvement helps to authenticate a Diffie-Hellman public key, and to frustrate man-in-the-middle attacks. The remote device keeps the master key shared with the group super device in secure non-volatile memory. All link keys may be derived dynamically from this master key.

After pairing, device the remote device RD1 may encounter another group device GDN. From that group device's group ID, the remote device is able to determine whether it has been virtually paired with this group 10. If so, the remote device does not need to pair again. Instead, the remote device initiates a link key negotiation process with the group device.

With reference again to FIG. 3. a process 200 is shown for establishing the wireless link key LK1 based on an established trust association. After the remote device RD1 receives the group identifier GID (step 310) and determines it has an established trust association with the group 10, it forwards a link setup request LSR to the group device GD1 (step 230, FIG. 2). The step of forwarding a link setup request may include generating (step 312) and forwarding a first random value N1 to the first group device GD1 (step 314). The remote device also forwards its address RD1-ID. The group device generates a second random value N2 (step 316), and forwards the random values and remote device's identity to the group super device (step 318). The first random value may be a first nonce N1, and the second random value may be comprises a second nonce N2. The group super device derives a link key using a key derivation function (KDF): LK1=KDF(N1, N2, MK1) (step 320). A typical KDF function can be found in ANSI X9.42 and X9.63. The group super device forwards the link key to the group device (step 322). The group device generates a first message integrity code MIC1 from the first and second random numbers and the link key. The message integrity code may be implemented by the HMAC algorithm, described in RFC2104. The group device sends the second random number N2 and the first message integrity code MIC1 to the remote device RD1 (step 326).

The remote device RD1 receives the second random value N2 and the first message integrity code MIC1 from the first group device GD1, and generates the wireless link key LK1 based on the first and second random values, N1 and N2, and the master key MK1 (step 328). The remote device also verifies the first message integrity code MIC1 using the first and second random values and the wireless link key (step 330). Further, the remote device may generate a second message integrity code MIC2 based on the first and second random values, N1 and N2, and the link key LK1, and forward the second message integrity code to the group device (step 334). The group device similarly verifies the second message integrity code MIC2 using the first and second random values and the wireless link key (step 336).

The present invention addresses significant security considerations. Only the group super device GS manages the master keys MK1-MKN shared with the remote devices RD1-RDN, and computes the link keys LK1 for between the remote devices and the group devices. The super node is generally well protected and may be less likely to be compromised. The group devices may be subject to various attacks (e.g., side channel attacks). A link key may be updated whenever one side of a link feels it is necessary. With the use of a key derivation function KDF, it is infeasible to derive a master key MK1 from the random values, N1 and N2, and the link key LK1. The group devices only know their own link keys. As a result, a compromised group device is not able to disclose a master key or other group device's link keys.

Figure 5:
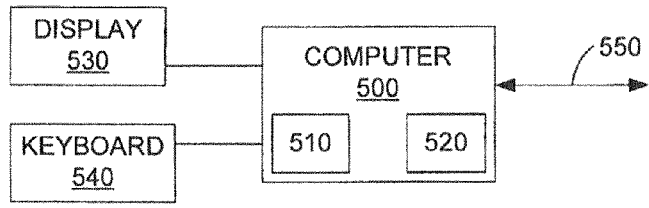
FIG. 5 is a block diagram of a computer including a processor, a memory, and user interface.

With reference to FIG. 5, another aspect of the invention may reside in a remote device RD1 that includes means (processor 510) for obtaining a group identifier GID from a group device GD1 over a wireless channel; means for determining, using the group identifier, whether the group device is associated with a group 10 having a trust association with the remote device; means for forwarding a link setup request LSR to the group device, when the group device is determined to be associated with a group having an established trust association with the remote device, for virtually pairing 12 the remote device and the group device using the trust association to establish the wireless link key; and means for forwarding a pairing request PR to the group device, when the group device is determined not to be associated with a group having an established trust association with the remote device, for pairing the remote device and the group device to establish the wireless link key.

The apparatus may further include a storage medium 520 such as memory, a display 530, and an input device 540 such as a keyboard. The apparatus may include a wireless connection 550.

Another aspect of the invention may reside in an apparatus 500 for establishment of a wireless link key LK1. The apparatus may include a processor 510 configured to: obtain a group identifier GID from the group device GD1 over a wireless channel; determine, using the group identifier, whether the group device is associated with a group having a trust association with a remote device RD1; forward a link setup request LSR to the group device, when the group device is determined to be associated with a group having an established trust association with the remote device, for virtually pairing 12 the remote device and the group device using the trust association to establish the wireless link key; and forward a pairing request PR to the group device, when the group device is determined not to be associated with a group having an established trust association with the remote device, for pairing the remote device and the group device to establish the wireless link key.

Another aspect of the invention may reside in a computer program product, comprising computer readable medium 520, comprising: code for causing a computer 500 to obtain a group identifier GID from the group device GD1 over a wireless channel; code for causing a computer to determine, using the group identifier, whether the group device is associated with a group having a trust association with a remote device RD1; code for causing a computer to forward a link setup request LSR to the group device, when the group device is determined to be associated with a group having an established trust association with the remote device, for virtually pairing 12 the remote device and the group device using the trust association to establish the wireless link key; and code for causing a computer to forward a pairing request PR to the group device, when the group device is determined not to be associated with a group having an established trust association with the remote device, for pairing the remote device and the group device to establish the wireless link key.

Figure 6:
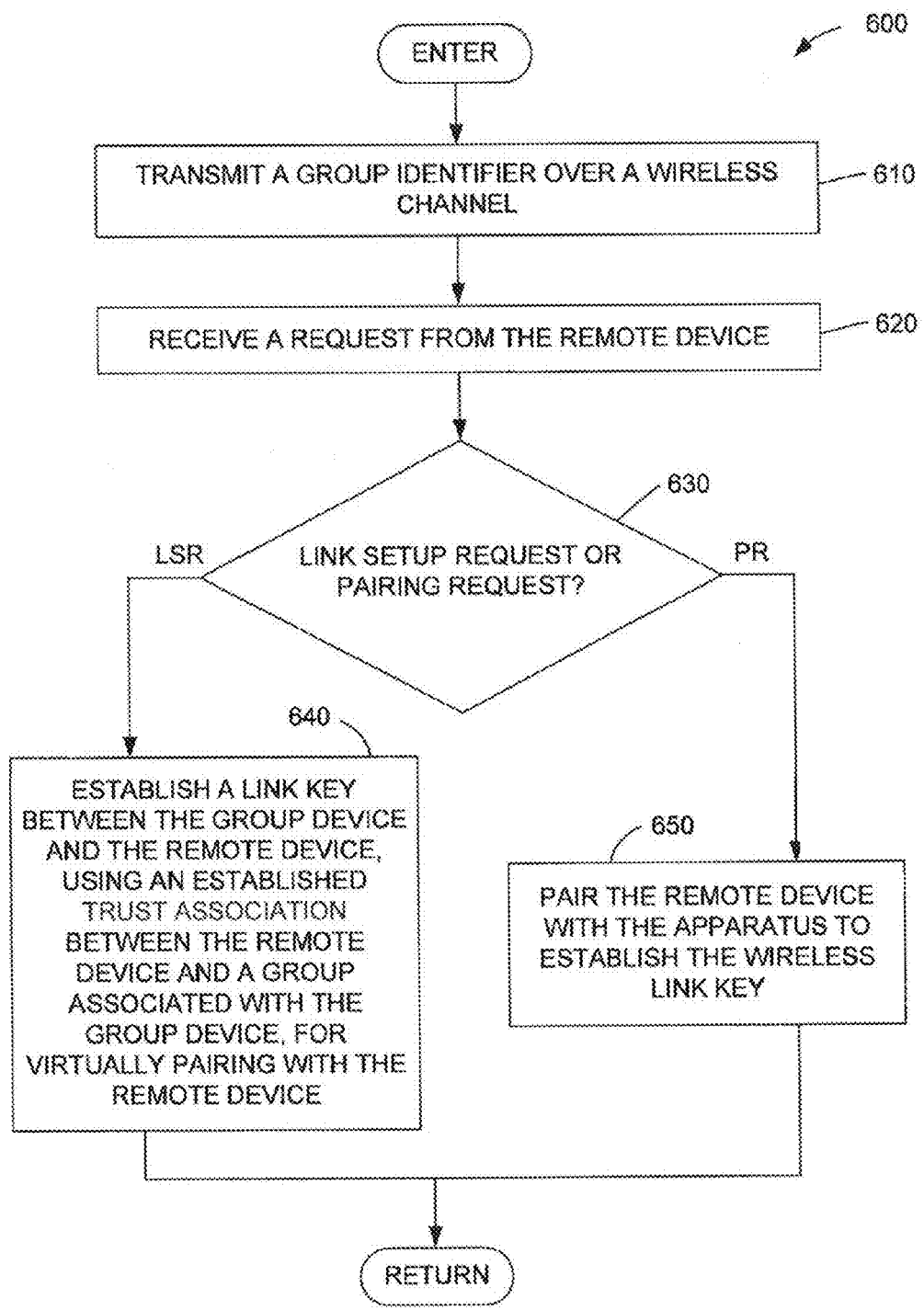
FIG. 6 is a flow diagram of a method for establishing a wireless link key between a remote device and a group device including a determination of whether a request from the remote device is a link setup request or a pairing request.

With reference to FIG. 6, an aspect of the invention may reside in another method 600 for establishing a wireless link key LK1 between a group device GD1 and a remote device. In the method, a group identifier GID for the group device is transmitted over a wireless channel (step 610). The group device receives a request from the remote device (step 620), and determines whether the request is a link setup request LSR or a pairing request PR (step 630). When the request is determined to be a link setup request, a link key between the group device and the remote device is established, using an established trust association between the remote device and a group associated with the group device, for virtually pairing 12 the group device with the remote device (step 640). When the request is determined to be a pairing request, the remote device with the group device are paired to establish the wireless link key (step 650).

Another aspect of the invention may reside in a group device GD1 that includes means (processor 510) for transmitting a group identifier GID for the group device over a wireless channel; means for receiving a request from a remote device RD1; means for determining whether the request is a link setup request LSR or a pairing request PR; means for establishing a link key LK1 between the group device and the remote device, using an established trust association between the remote device and a group associated with the group device, for virtually pairing 12 the group device with the remote device when the request is determined to be a link setup request; and means for pairing the remote device with the group device to establish the wireless link key when the request is determined to be a pairing request.

Another aspect of the invention may reside in an apparatus GD1 for establishment of a wireless link key. The apparatus may include a processor 510 configured to: transmit a group identifier GID for the apparatus over a wireless channel; receive a request from the remote device RD1; determine whether the request is a link setup request LSR or a pairing request PR; establish a link key LK1 between the apparatus and the remote device, using an established trust association between the remote device and a group associated with the apparatus when the request is determined to be a link setup request, for virtually pairing 12 the apparatus with the remote device; and pairing the remote device with the apparatus to establish the wireless link key when the request is determined to be a pairing request.

Another aspect of the invention may reside in a computer program product, comprising computer readable medium 520, comprising: code for causing a computer 500 to transmit a group identifier GID for a group device GD1 over a wireless channel; code for causing a computer to receive a request from a remote device RD1; code for causing a computer to determine whether the request is a link setup request LSR or a pairing request PR; code for causing a computer to establish a link key LK1 between the group device and the remote device, using an established trust association between the remote device and a group associated with the group device when the request is determined to be a link setup request, for virtually pairing 12 the group device with the remote device; and code for causing a computer to pair the remote device with the group device to establish the wireless link key when the request is determined to be a pairing request.

Figure 7:
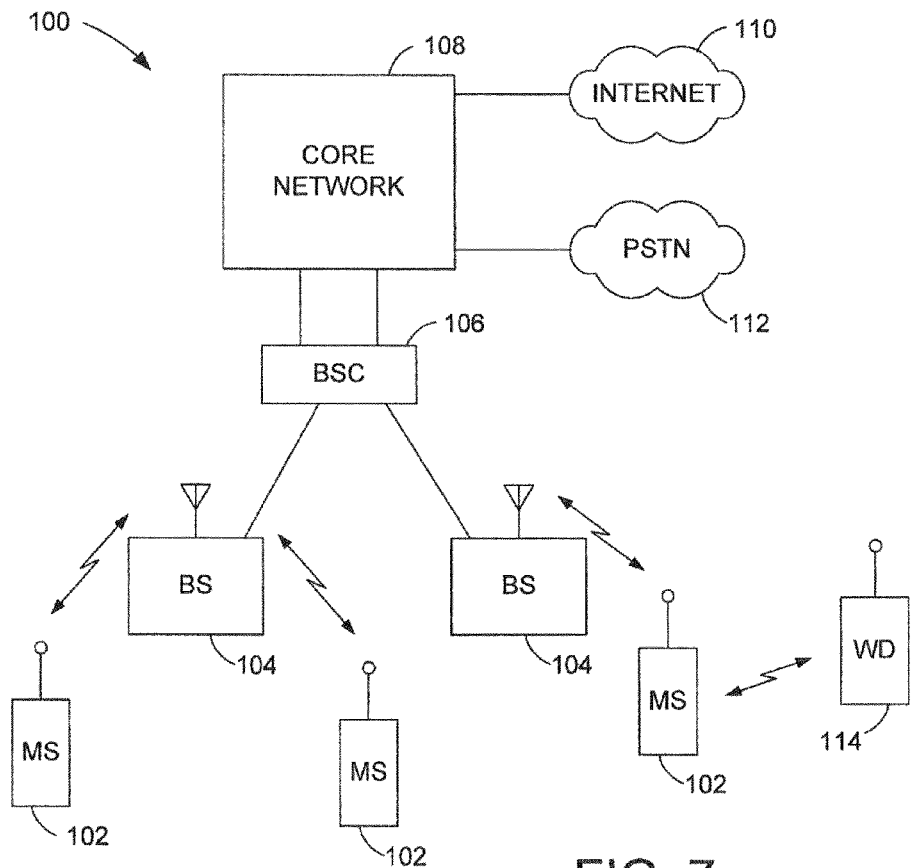
FIG. 7 is a block diagram of an example of a wireless communication system.

With reference to FIG. 7, the remote device RD1 may be a wireless mobile station (MS) 102 that also may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device RD1 may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory; ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for establishing a wireless link key between a remote device and a group device, the method comprising:
    receiving a group identification and a device identification from the group device over a wireless channel, wherein the group identification is associated with a plurality of group devices and the device identification is associated only with the group device;
    determining, using the group identification, whether the group device is associated with a group having a trust association with the remote device;
    forwarding a link setup request to the group device, when the group device is determined to be associated with a group having an established trust association with the remote device, for virtually pairing the remote device and the group device using the trust association to establish the wireless link key; and
    forwarding a pairing request to the group device, when the group device is determined not to be associated with a group having an established trust association with the remote device, for pairing the remote device and the group device to establish the wireless link key.

2. The method of claim 1, wherein the step of forwarding a pairing request is further for establishing a trust association with the group.

3. The method of claim 1, wherein the trust association is a master key stored by the remote device and by at least one group super device, wherein the master key is specific to the remote device having been generated in response to a previous pairing request from the remote device to another group device.

4. The method of claim 3, wherein the step of forwarding a link setup request further comprises forwarding a first random value to the group device.

5. The method of claim 4, further comprising:
    the remote device receiving a second random value from the group device, and generating the wireless link key based on the first and second random values and the master key.

6. The method of claim 5, further comprising:
    the remote device receiving a first message integrity code from the group device, and verifying the first message integrity code using the first and second random values and the wireless link key.

7. The method of claim 6, further comprising:
    the remote device generating a second message integrity code based on the first and second random values and the wireless link key, and forwarding the second message integrity code to the group device.

8. The method of claim 7, wherein:
    the first random value comprises a first nonce; and
    the second random value comprises a second nonce.

9. The method of claim 3, wherein the master key is stored by at least one group super device in association with an identification value for the remote device.

10. The method of claim 9, wherein the remote device's identification value comprises an address for the remote device.

11. The method of claim 1, wherein the group identification is included in an address for the group device.

12. The method of claim 1, wherein:
    the group device is a reader device; and
    the remote device is a sensor device.

13. A remote device, comprising:
    means for receiving a group identification and a device identification from a group device over a wireless channel, wherein the group identification is associated with a plurality of group devices and the device identification is associated only with the group device;
    means for determining, using the group identification, whether the group device is associated with a group having a trust association with the remote device;
    means for forwarding a link setup request to the group device, when the group device is determined to be associated with a group having an established trust association with the remote device, for virtually pairing the remote device and the group device using the trust association to establish the wireless link key; and
    means for forwarding a pairing request to the group device, when the group device is determined not to be associated with a group having an established trust association with the remote device, for pairing the remote device and the group device to establish the wireless link key.

14. The remote device of claim 13, wherein the means for forwarding a pairing request further comprises means for establishing a trust association with the group.

15. The remote device of claim 13, wherein the trust association is a master key stored by the remote device and by at least one group super device, wherein the master key is specific to the remote device having been generated in response to a previous pairing request from the remote device to another group device.

16. The remote device of claim 15, wherein the means for forwarding a link setup request further comprises means for forwarding a first random value to the group device.

17. The remote device of claim 16, further comprising:
    means for receiving a second random value from the group device, and
    means for generating the wireless link key based on the first and second random values and the master key.

18. The remote device of claim 17, further comprising:
    means for receiving a first message integrity code from the group device, and
    means for verifying the first message integrity code using the first and second random values and the wireless link key.

19. The remote device of claim 18, further comprising:
means for generating a second message integrity code based on the first and second random values and the wireless link key; and
means for forwarding the second message integrity code to the group device.

20. The remote device of claim 19, wherein:
the first random value comprises a first nonce; and
the second random value comprises a second nonce.

21. The remote device of claim 15, wherein the master key is stored by at least one group super device in association with an identification value for the remote device.

22. The remote device of claim 21, wherein the remote device's identification value comprises an address for the remote device.

23. The remote device of claim 13, wherein the group identification is included in an address for the group device.

24. The remote device of claim 13, wherein:
the group device is a reader device; and
the remote device is a sensor device.

25. An apparatus for establishment of a wireless link key, comprising:
a processor configured to:
receive a group identification and a device identification from the group device over a wireless channel, wherein the group identification is associated with a plurality of group devices and the device identification is associated only with the group device;
determine, using the group identification, whether the group device is associated with a group having a trust association with a remote device;
forward a link setup request to the group device, when the group device is determined to be associated with a group having an established trust association with the remote device, for virtually pairing the remote device and the group device using the trust association to establish the wireless link key; and
forward a pairing request to the group device, when the group device is determined not to be associated with a group having an established trust association with the remote device, for pairing the remote device and the group device to establish the wireless link key.

26. The apparatus of claim 25, wherein the trust association is a master key stored by the remote device and by at least one group super device, wherein the master key is specific to the remote device having been generated in response to a previous pairing request from the remote device to another group device.

27. The apparatus of claim 26, wherein the master key is stored by at least one group super device in association with an identification value for the apparatus.

28. The apparatus of claim 27, wherein the identification value of the apparatus comprises an address for the apparatus.

29. The apparatus of claim 25, wherein the group identification is included in an address for the group device.

30. The apparatus of claim 25, wherein:
the group device is a reader device; and
the apparatus is a sensor device.

31. A computer program product, comprising:
non-transitory computer readable medium, comprising:
code for causing a computer to receive a group identification and a device identification from the group device over a wireless channel, wherein the group identification is associated with a plurality of group devices and the device identification is associated only with the group device;
code for causing a computer to determine, using the group identification, whether the group device is associated with a group having a trust association with a remote device;
code for causing a computer to forward a link setup request to the group device, when the group device is determined to be associated with a group having an established trust association with the remote device, for virtually pairing the remote device and the group device using the trust association to establish the wireless link key; and
code for causing a computer to forward a pairing request to the group device, when the group device is determined not to be associated with a group having an established trust association with the remote device, for pairing the remote device and the group device to establish the wireless link key.

32. The computer program product of claim 31, wherein the code for causing a computer to forward a pairing request further comprises code for causing a computer to establish a trust association with the group.

33. The computer program product of claim 31, wherein the trust association is a master key stored by the remote device and by at least one group super device, wherein the master key is specific to the remote device having been generated in response to a previous pairing request from the remote device to another group device.

34. The computer program product of claim 33, wherein the master key is stored by at least one group super device in association with an identification value.

35. The computer program product of claim 34, wherein the identification value comprises an address.

36. The computer program product of claim 31, wherein the group identification is included in an address for the group device.

37. The computer program product of claim 31, wherein:
the group device is a reader device; and
the remote device is a sensor device.

38. A method for establishing a wireless link key between a group device and a remote device, the method comprising:
transmitting a group identification and a device identification for the group device over a wireless channel, wherein the group identification is associated with a plurality of group devices and the device identification is associated only with the group device;
receiving a request from the remote device;
determining whether the request is a link setup request or a pairing request;
when the request is determined to be a link setup request, establishing a link key between the group device and the remote device, using an established trust association between the remote device and a group associated with the group device, for virtually pairing the group device with the remote device; and
when the request is determined to be a pairing request, pairing the remote device with the group device to establish the wireless link key.

39. The method of claim 38, further comprising:
establishing, for the remote device, a trust association with the group when the request is determined to be a pairing request.

40. The method of claim 38, wherein the trust association is a master key stored by the remote device and by at least one group super device, wherein the master key is specific to the remote device having been generated in response to a previous pairing request from the remote device to another group device.

41. The method of claim 40, further comprising:
receiving, with the link setup request, a first random value and an identification value associated only with the remote device;
generating a second random value; and
forwarding the first and second random values, and remote device's identification value, to at least one group super device.

42. The method of claim 41, further comprising:
receiving a wireless link key generated by a group super device based on the first and second random values and the master key associated only with the remote device's identification value; and
forwarding the second random value and a first message integrity code, to the remote device, wherein the first message integrity code is generated based on the first and second random values and the wireless link key.

43. The method of claim 42, further comprising:
receiving a second message integrity code from the remote device, wherein the second message integrity code is generated by the remote device based on the first and second random values and the wireless link key; and
verifying the second message integrity key using the first and second random values and the wireless link key to further establish the wireless link key.

44. The method of claim 42, wherein:
the first random value comprises a first nonce; and
the second random value comprises a second nonce.

45. The method of claim 42, wherein the master key is stored by at least one group super device in association with an identification value for the remote device.

46. The method of claim 45, wherein the remote device's identification value comprises an address for the remote device.

47. The method of claim 38, wherein the group identification is included in an address for the group device.

48. The method of claim 38, wherein:
the group device is a reader device; and
the remote device is a sensor device.

49. A group device, comprising:
means for transmitting a group identification and a device identification for the group device over a wireless channel, wherein the group identification is associated with a plurality of group devices and the device identification is associated only with the group device;
means for receiving a request from a remote device;
means for determining whether the request is a link setup request or a pairing request;
means for establishing a link key between the group device and the remote device, using an established trust association between the remote device and a group associated with the group device, for virtually pairing the group device with the remote device when the request is determined to be a link setup request; and
means for pairing the remote device with the group device to establish the wireless link key when the request is determined to be a pairing request.

50. The group device of claim 49, further comprising:
means for establishing, for the remote device, a trust association with the group when the request is determined to be a pairing request.

51. The group device of claim 49, wherein the trust association is a master key stored by the remote device and by at least one group super device, wherein the master key is specific to the remote device having been generated in response to a previous pairing request from the remote device to another group device.

52. The group device of claim 51, further comprising:
means for receiving, with the link setup request, a first random value and an identification value associated only with the remote device;
means for generating a second random value; and
means for forwarding the first and second random values, and remote device's identification value, to at least one group super device.

53. The group device of claim 52, further comprising:
means for receiving a wireless link key generated by a group super device based on the first and second random values and the master key associated only with the remote device's identification value; and
means for forwarding the second random value and a first message integrity code, to the remote device, wherein the first message integrity code is generated based on the first and second random values and the wireless link key.

54. The group device of claim 53, further comprising:
means for receiving a second message integrity code from the remote device, wherein the second message integrity code is generated by the remote device based on the first and second random values and the wireless link key; and
means for verifying the second message integrity key using the first and second random values and the wireless link key to further establish the wireless link key.

55. The group device of claim 53, wherein:
the first random value comprises a first nonce; and
the second random value comprises a second nonce.

56. The group device of claim 53, wherein the master key is stored by at least one group super device in association with an identification value for the remote device.

57. The group device of claim 56, wherein the remote device's identification value comprises an address for the remote device.

58. The group device of claim 49, wherein the group identification is included in an address for the group device.

59. The group device of claim 49, wherein:
the group device is a reader device; and
the remote device is a sensor device.

60. An apparatus for establishment of a wireless link key, comprising:
a processor configured to:
transmit a group identification and a device identification for the apparatus over a wireless channel, wherein the group identification is associated with a plurality of group devices and the device identification is associated only with the group device;
receive a request from the remote device;
determine whether the request is a link setup request or a pairing request;
establish a link key between the apparatus and the remote device, using an established trust association between the remote device and a group associated with the apparatus when the request is determined to be a link setup request, for virtually pairing the apparatus with the remote device; and
pairing the remote device with the apparatus to establish the wireless link key when the request is determined to be a pairing request.

61. The apparatus of claim 60, wherein the processor is further configured to:
establish, for the remote device, a trust association with the group when the request is determined to be a pairing request.

62. The apparatus of claim 60, wherein the trust association is a master key stored by the remote device and by at least one group super device, wherein the master key is specific to the remote device having been generated in response to a previous pairing request from the remote device to another group device.

63. The apparatus of claim 62, wherein the processor is further configured to:
receive, with the link setup request, a first random value and an identification value associated only with the remote device;
generate a second random value; and
forward the first and second random values, and remote device's identification value, to at least one group super device.

64. The apparatus of claim 63, wherein the processor is further configured to:
receive a wireless link key generated by a group super device based on the first and second random values and the master key associated only with the remote device's identification value; and
forward the second random value and a first message integrity code, to the remote device, wherein the first message integrity code is generated based on the first and second random values and the wireless link key.

65. The apparatus of claim 64, wherein the processor is further configured to:
receive a second message integrity code from the remote device, wherein the second message integrity code is generated by the remote device based on the first and second random values and the wireless link key; and
verify the second message integrity key using the first and second random values and the wireless link key to further establish the wireless link key.

66. The apparatus of claim 64, wherein:
the first random value comprises a first nonce; and
the second random value comprises a second nonce.

67. The apparatus of claim 64, wherein the master key is stored by at least one group super device in association with an identification value for the remote device.

68. The apparatus of claim 67, wherein the remote device's identification value comprises an address for the remote device.

69. The apparatus of claim 60, wherein the group identification is included in an address for the apparatus.

70. The apparatus of claim 60, wherein:
the apparatus is a reader device; and
the remote device is a sensor device.

71. A computer program product, comprising:
non-transitory computer readable medium, comprising:
code for causing a computer to transmit a group identification and a device identification for a group device over a wireless channel, wherein the group identification is associated with a plurality of group devices and the device identification is associated only with the group device;
code for causing a computer to receive a request from a remote device;
code for causing a computer to determine whether the request is a link setup request or a pairing request;
code for causing a computer to establish a link key between the group device and the remote device, using an established trust association between the remote device and a group associated with the group device when the request is determined to be a link setup request, for virtually pairing the group device with the remote device; and
code for causing a computer to pair the remote device with the group device to establish the wireless link key when the request is determined to be a pairing request.

72. The computer program product of claim 71, further comprising:
code for causing a computer to establish, for the remote device, a trust association with the group when the request is determined to be a pairing request.

73. The computer program product of claim 71, wherein the trust association is a master key stored by the remote device and by at least one group super device, wherein the master key is specific to the remote device having been generated in response to a previous pairing request from the remote device to another group device.

74. The computer program product of claim 73, further comprising:
code for causing a computer to receive, with the link setup request, a first random value and an identification value associated only with the remote device;
code for causing a computer to generate a second random value; and
code for causing a computer to forward the first and second random values, and remote device's identification value, to at least one group super device.

75. The computer program product of claim 74, further comprising:
code for causing a computer to receive a wireless link key generated by a group super device based on the first and second random values and the master key associated only with the remote device's identification value; and
code for causing a computer to forward the second random value and a first message integrity code, to the remote device, wherein the first message integrity code is generated based on the first and second random values and the wireless link key.

76. The computer program product of claim 75, further comprising:
code for causing a computer to receive a second message integrity code from the remote device, wherein the second message integrity code is generated by the remote device based on the first and second random values and the wireless link key; and
code for causing a computer to verify the second message integrity key using the first and second random values and the wireless link key to further establish the wireless link key.

77. The computer program product of claim 75, wherein:
the first random value comprises a first nonce; and
the second random value comprises a second nonce.

78. The computer program product of claim 75, wherein the master key is stored by at least one group super device in association with an identification value for the remote device.

79. The computer program product of claim 78, wherein the remote device's identification value comprises an address for the remote device.

80. The computer program product of claim 71, wherein the group identification is included in an address for the group device.

81. The computer program product of claim 71, wherein:
the group device is a reader device; and
the remote device is a sensor device.

* * * * *